UNITED STATES PATENT OFFICE.

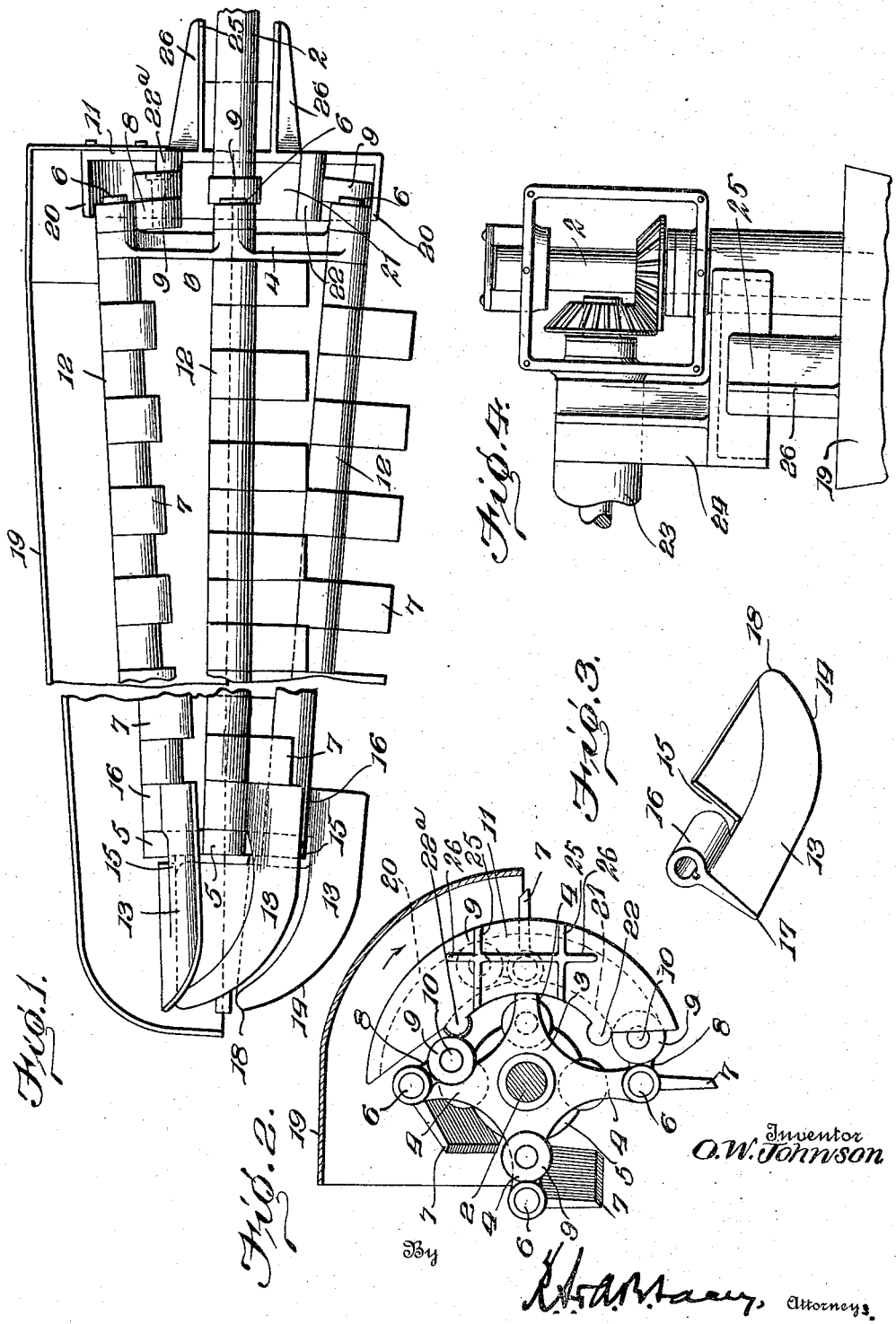

OLIVER W. JOHNSON, OF CLEVELAND, OHIO.

CULTIVATOR.

1,191,430.      Specification of Letters Patent.      Patented July 18, 1916.

Original application filed April 18, 1914, Serial No. 832,997. Divided and this application filed October 28, 1915. Serial No. 58,462.

*To all whom it may concern:*

Be it known that I, OLIVER W. JOHNSON, a citizen of the United States, residing at Cleveland, in the county of Cuyahoga and State of Ohio, have invented certain new and useful Improvements in Cultivators, of which the following is a specification.

This application is a division of an application filed by me April 18, 1914, Serial No. 832,997.

One object of the present invention is to provide a rotary cultivator with teeth which will be automatically projected into the soil, carried downward and rearward and then upward and out of the ground, the teeth being so mounted that they will force downward the top soil and force upward and outward the bottom soil thus laying the top soil upon the bottom so as to completely overturn the soil to the depth of the cut.

Another object of the invention is to provide end shovels so formed that they will burrow in as well as work on top of the soil which is very necessary where vines or other plants are ridged up and weedy.

Another object is to provide a rotary cultivator with a plurality of shovels so arranged that they are held rigidly in a radial position as they enter the ground and continue to be so held until the lowest point of the cut is reached whereupon they are released so as to be drawn from the ground without disturbing it.

Another object of the invention is to provide a hood or shield adapted to lift vines and permit the working elements of the cultivator to pass under the same and thereby avoid injury thereto.

The invention also has for an object the provision of a cultivator which may be propelled and operated by a tractor and work close to and under vines while the tractor is away from the vines.

Other objects will appear as the description proceeds.

In the annexed drawing: Figure 1 is a front elevation of a rotary cultivator embodying my improvements; Fig. 2 is an elevation of the inner end of the cultivator; Fig. 3 is a detail perspective view of one of the end blades; Fig. 4 is a detail view to show the manner of supporting the cultivator.

Each cultivator consists of a central shaft 2 which is rotatably mounted in suitable bearings. Disposed at one end of the shaft or adjacent one end is a spider 3 having a plurality of arms 4. Four arms are illustrated but a greater or less number might be provided. Mounted adjacent the outer end of the shaft is a spider 5 which has practically the same form as the spider 3 and is also provided with four arms. The arms of the spider 5, however, are less in length than the arms of the spider 3, and these arms are set at a slight angle to the central portion of the spider.

Carried upon the corresponding arms of the spiders 3 and 5 are a plurality of shafts 6, these shafts therefore extending longitudinally but in an angular relation to the central shaft 2 of the cultivator. These shafts are free to turn in the bearings in the ends of the spiders and carry upon them a plurality of cutting blades or shovels 7 which are keyed upon or otherwise attached to the shafts to rotate therewith. Each shaft 6 at its inner end has keyed thereto an arm 8 carrying a roller 9 which is mounted upon the free end of the arm in any suitable manner as by means of the wrist pin 10. The rollers 9 are adapted to engage with a cam 11 which will be later described, it being sufficient now to say that during the engagement of the rollers 9 with the tracks of the cam 11 the blades 7 will be held in a radially projected position.

The shovels or blades 7 on each shaft are separated from each other by means of sleeves 12 disposed between them. Blades of peculiar form are mounted upon the end of the cultivator, these blades, however, operating in precisely the same manner as the blades 7. One of these end blades is shown in Fig. 3. It comprises a flat faced blade-like portion 13 having a rounded outer end edge 14 and having a longitudinal strengthening rib or fin on the inner edge of its outer portion, the rear end of said rib being cut away as at 15 to accommodate an arm of the spider 5. This rib or fin also prevents the dirt from filling the space between the working edges of the blades. The inner end of this blade 13 is formed with a collar 16 which surrounds the corresponding shaft 6 as shown clearly in Fig. 1. The blade 13 is beveled as at 17 to a cutting edge. The extremity 18 of the blade is rounded, and, when the apparatus is in operation, will contact with the soil at the level of the ground while the rounded edge 14 will cut into the soil below the level of the ground, the depth of the blade at its inner end being approximately the same as the depth of the blade 7. These blades 13 will rotate with the shaft 6 in precisely the same manner as the blades 7 and will be held from rotation and released to permit free rotation in the same manner as the blades 7. A hood 19 is mounted upon the face of the cam plate 11 and extends to the end of the cultivator and partially over the same as shown in Figs. 1 and 2. It will be readily noted, upon reference to Fig. 2, that the shield is adapted to pass under the vines and cause them to ride up and pass over the earth-working elements out of contact therewith so as to be saved from injury.

The cam plate 11 is formed with the inwardly projecting cam flanges 20 and 21 which are concentric to each other and separated from each other a space equal to the diameter of the rollers 9. The cam flange 21 at its extremities is rounded as at 22 and 22ª.

Referring now to Fig. 2, it will be seen that the shaft 3 rotates in the direction of the arrow and that as a roller 9 reaches the upper end of the cam track, it will contact with the rounded portion 22ª and that this will cause the shaft 6 to be rocked into such position that the blades 7 and the blade 13 thereon will be held in a radially projected position. These blades will continue to be held in a radially projected position and held rigidly from any turning movement by said cam track formed between the flanges 21 and 20 until the roller 9 leaves the end of the cam track. At this time the blades 7 will have reached their deepest projection into the soil as shown in Fig. 2, and as soon as the roller 9 has left the cam track, the blades are free to turn. As the blades leave the ground, they will have a vertical position and will remain vertical until the roller again comes in contact with the rounded end 22ª of the cam track as previously described which will act to turn the roller into such position that the blades will be again projected radially to the shaft 2. The member 22ª may be covered with rubber, leather, or other elastic or shock-absorbing material to reduce wear and noise and avoid breakage of the engaging members.

It will be noted that the outer wall of the cam track, together with the web connecting the two walls of said track, constitute a guard to prevent the roller and the end of the crank arm being struck by adjacent objects or flying stones and thereby being damaged. These members also prevent the roller moving away from the path marked out for it under centrifugal force or the force of gravity so that the blades will not be withdrawn from their projected position prematurely.

The cultivator is supported upon the extremity of a hollow or tubular arm 23 which at one end is pivotally mounted upon the supporting frame of the machine and at its opposite end carries an angular bracket 24 which is engaged by flanges 25 projecting from the cam 11 and reinforced by ribs 26, the cam being thus held stationary. The shaft 2 is suitably geared to a driving shaft passing through the arm 23.

Attention is particularly called to the fact that each cultivator is tapered and supported at one end only so that the small end of the tapering cultivator is free to run under vines and in low places impossible to be reached with any other power-operated cultivating instrument known to me. The tapering form of the cultivator as before remarked acts to cultivate the soil relatively deeply near the basal end of the cultivator and make the cultivation shallow toward the free end of the cultivator, that is, that end nearest the vines or trees. Furthermore, the peculiar shape of the end shovels is such that they are adapted to burrow into the soil as well as to work in or on the top of the soil, and this is particularly necessary where vines are ridged up and weedy. This ridging up of the soil around the vines and trees to protect them from excessive cold and insects is customary in many localities and as the end shovels are closed at their ends, the ends will not readily wrap the weeds and other refuse around the points and thus clog them.

Another function, due to the peculiar shape of these shovels and the fact that the shovels revolve is as follows: The use of cover crops for turning under is now growing in favor and preferably this cover crop is sown in the fall to lie over winter and then be plowed under in the spring. The peculiar form of the shovels of this cultivator permits the sowing or placing of this cover crop close up to a tree or vine and then plowing under this cover crop without injury to the plant and yet the plowing may be performed close enough to the plant to be of important benefit to the roots but without injury thereto.

Having thus described the invention, what is claimed as new is:

1. A rotary cultivator having a relatively large basal end and tapering toward its other end, said cultivator being provided at its tapered end with longitudinally extending blades having their working edges inclined outward and toward the axis of the cultivator each of said blades being rotatable about its own axis.

2. A rotary cultivator having a relatively large basal end and tapering toward its opposite end, and blades disposed longitudinally at the tapered end of the cultivator having working edges extending outward and toward the axis of the cultivator and provided on their opposite edges with fins projecting across their own axes.

3. A rotary cultivator having a relatively large basal end and tapering toward its opposite end, and blades disposed longitudinally at the tapered end of the cultivator having working edges curved outward and toward the axis of the cultivator, said edges extending into line with the axial center of the cultivator and the opposite edges of the blades being provided with longitudinal fins extending across the axes of the respective blades.

4. A rotary cultivator including a central shaft, a plurality of sets of blades mounted upon said shaft and spaced therefrom, the axial center of each set of blades being inclined inwardly toward the said shaft from the basal portion of the cultivator toward the outer extremity thereof, and means disposed around the central shaft for swinging each set of blades around its own axis as it rotates around the central shaft.

5. A cultivator including a central shaft, a plurality of sets of blades mounted upon said central shaft, the axial center of each set of blades extending from the basal portion of the cultivator to the tapering end thereof and toward the central shaft of the cultivator, and blades mounted upon the small end of the cultivator and each having a working edge extending outward and toward the axial center of the cultivator.

6. A cultivator including a rotatable main shaft, a plurality of series of blades supported from the main shaft and conveying toward the outer end of and rotatable around the said shaft, each series being rotatable upon its own axis, and a fixed cam at the inner end of the main shaft operatively engaging the several series of blades to hold the blades in a projected position during a certain portion of the movement of the blades and to release said blades from said projected position upon the remainder of their movement.

7. A cultivator including a central shaft, supporting members mounted upon said shaft, a series of shafts mounted upon the supporting members, said series extending concentrically to the central shaft and converging toward the outer end of the same, each of said second-named shafts being independently rotatable around its own axis, a plurality of cultivator blades mounted upon each of said second named shafts, and a cam disposed at the inner end of the central shaft in the path of movement of the ends of said second named shafts, said cam acting to rotate said second named shafts to a position to project the blades during a portion of the movement of said shafts around the central shaft and release said second named shafts during the remainder of the movement of the second named shafts.

8. A cultivator including a central shaft, supporting members mounted thereon, a series of blade-supporting shafts mounted in the supporting members concentrically to the central shaft and converging toward the outer end of the same, blades mounted upon each of said blade-supporting shafts, arms extending from each of said blade-supporting shafts and having laterally projecting rollers, and an arcuate cam having a channeled cam track disposed in the path of the blade-supporting shafts and adapted to receive said rollers, said cam by its engagement with the rollers acting to turn the blade-supporting shafts to project the blades and then hold said shafts from rotation with their blades projected during a portion of the travel of said shafts and to release said shafts from such position upon the remainder of the travel.

9. A cultivator including a central shaft, supporting members mounted upon the shaft, a plurality of blade-supporting shafts mounted on the supporting members concentrically to the central shaft and converging toward the outer end of the same, a plurality of blades mounted on each of the blade-supporting shafts, arms projecting from the inner ends of the blade-supporting shafts at right angles to the blades, and an arcuate channeled cam track disposed in the path of movement of the extremities of said shafts and adapted to successively engage each of said arms and rotate it and its corresponding shaft into a position to project the blades and then receive said arms and the ends of the shafts to hold the blades projected during a certain portion of the travel of the blades and then release the blades.

10. A cultivator including a supporting frame, a main shaft mounted on the frame, supporting members on the main shaft, blade-supporting shafts rotatably mounted upon the supporting members concentric with the main shaft and converging toward the outer end of the same, blades mounted upon the blade-supporting shafts, an arm extending radially from each blade-supporting shaft at right angles to the blades and each having a laterally projecting roller, and an arcuate cam disposed in advance of the main shaft, said cam including spaced arcuate guiding walls between which the rollers and the ends of the blade-supporting shaft are received, the entrance end of the wall nearer the main shaft being rounded and disposed in the path of movement of said rollers as they arrive in their uppermost position whereby to engage said rollers and rotate the blade supporting shaft to carry the blades into a projected position, said cam extending downward and rearward and terminating at such a position as to release its engagement with the rollers at a point where the blades are in their lowermost position.

11. The combination of a central shaft, supports on said shaft, a plurality of blade carrying shafts mounted in said supports, blades carried by said shafts, arms extending from the inner ends of said blade-supporting shafts at an angle to the blades, the blade-supporting shafts being independently rotatable in the supports and the supports being fixed to the central shaft, and a cam disposed at the inner end of the central shaft and comprising concentric arcuate walls, the inner of said arcuate concentric walls having one end disposed in the path of the free ends of the arms at the inner ends of the blade-supporting shafts whereby to be engaged by said arms and effect a rotation of the blade-supporting shafts, and the outer of said concentric arcuate walls being disposed to overhang the free ends of the said arms whereby the ends of the arms and the ends of the blade-supporting shafts will travel between said walls to the lowest point of the cam and be released from the cam when the blades are at the lowest point of their travel.

12. A cultivator including a central shaft, supporting members mounted upon said shaft, a series of shafts mounted upon the supporting members, said series extending concentrically to the central shaft, each of said second-named shafts being independently rotatable around its own axis, a plurality of cultivator blades mounted upon each of said second named shafts, a cam disposed in the path of movement of the ends of said second named shafts, said cam acting to rotate said second named shafts to a position to project the blades during a portion of the movement of said shafts around the central shaft and release said second named shafts during the remainder of the movement of the second named shafts, and a shock absorber on the cam at the point of engagement of the same by the shafts.

13. A rotary cultivator comprising a central shaft, means for rotating said shaft, a plurality of blade-supporting shafts carried by the said central shaft in concentric spaced relation thereto and converging toward the outer end of the same, a plurality of blades on each blade-supporting shaft and projecting radially therefrom, longitudinally extending blades at the outer ends of the blade-supporting shafts projecting beyond the same and having their working edges inclined toward the axis of the central shaft, and means at the inner ends of the shafts to partly rotate the blade-supporting shafts and hold the blades radially to the central shaft during a portion of the rotation of said central shaft.

In testimony whereof I affix my signature.

OLIVER W. JOHNSON. [L. S.]

Copies of this patent may be obtained for five cents each, by addressing the "Commissioner of Patents, Washington, D. C."